US012451550B2

(12) United States Patent
Gil et al.

(10) Patent No.: US 12,451,550 B2
(45) Date of Patent: Oct. 21, 2025

(54) PAYLOAD CONTAINER WITH POWER SUPPLY FOR UNMANNED SYSTEMS

(71) Applicant: UNITED PARCEL SERVICE OF AMERICA, INC., Atlanta, GA (US)

(72) Inventors: Julio Gil, Veldhoven (NL); Jeff Luckett, Louisville, KY (US); Julian Bell, Decatur, GA (US); Jared Nauert, Louisville, KY (US)

(73) Assignee: United Parcel Service of America, Inc., Atlanta, GA (US)

( * ) Notice: Subject to any disclaimer, the term of this patent is extended or adjusted under 35 U.S.C. 154(b) by 759 days.

(21) Appl. No.: 17/712,451

(22) Filed: Apr. 4, 2022

(65) Prior Publication Data
US 2022/0320669 A1    Oct. 6, 2022

Related U.S. Application Data

(60) Provisional application No. 63/237,392, filed on Aug. 26, 2021, provisional application No. 63/171,336, filed on Apr. 6, 2021.

(51) Int. Cl.
*H01M 50/249* (2021.01)
*B64C 25/34* (2006.01)
(Continued)

(52) U.S. Cl.
CPC .......... *H01M 50/249* (2021.01); *B64C 25/34* (2013.01); *B64C 39/024* (2013.01); *B64D 1/12* (2013.01);
(Continued)

(58) Field of Classification Search
None
See application file for complete search history.

(56) References Cited

U.S. PATENT DOCUMENTS 720,395 A    2/1903  Ash et al.
3,948,466 A  4/1976  Rudder et al.
(Continued)

FOREIGN PATENT DOCUMENTS

CH    508541 A     6/1971
CN    102785937 A  11/2012
(Continued)

OTHER PUBLICATIONS

Non-Final Office Action received for U.S. Appl. No. 17/711,739, mailed on Sep. 26, 2024, 8 pages.
(Continued)

*Primary Examiner* — Timothy J Thompson
*Assistant Examiner* — John B Freal
(74) *Attorney, Agent, or Firm* — Shook, Hardy & Bacon Bacon LLP/UPS

(57) ABSTRACT

A case for carrying loads by an Unmanned Aerial Vehicle (UAV) comprises a first end comprising a first cap and a first opening and a second end comprising a second cap and a second opening, the second opening being smaller than the first opening. The case also comprises a rechargeable battery pack that, when the case is secured to the UAV, is configured to provide a power source for the UAV and the first cap and the second cap each comprising at least one metal connector for providing power to the UAV.

19 Claims, 8 Drawing Sheets

(51) Int. Cl.
    *B64C 39/02*     (2023.01)
    *B64D 1/12*     (2006.01)
    *B64D 1/22*     (2006.01)
    *B64D 9/00*     (2006.01)
    *B64F 1/32*     (2006.01)
    *B64U 10/13*     (2023.01)
    *B64U 30/20*     (2023.01)
    *B64U 50/39*     (2023.01)
    *B64U 60/00*     (2023.01)
    *B64U 101/60*     (2023.01)
    *B64U 101/64*     (2023.01)
    *B65G 51/26*     (2006.01)
    *F15B 15/20*     (2006.01)

(52) U.S. Cl.
    CPC ................ *B64D 1/22* (2013.01); *B64D 9/00* (2013.01); *B64F 1/32* (2013.01); *B64U 10/13* (2023.01); *B64U 50/39* (2023.01); *B64U 60/00* (2023.01); *B65G 51/26* (2013.01); *F15B 15/20* (2013.01); *B64U 30/20* (2023.01); *B64U 2101/60* (2023.01); *B64U 2101/64* (2023.01); *H01M 2220/20* (2013.01)

(56) References Cited

U.S. PATENT DOCUMENTS

| | | | |
|---|---|---|---|
| 4,416,197 A | 11/1983 | Kehl | |
| 5,508,908 A | 4/1996 | Kazama et al. | |
| 5,697,625 A | 12/1997 | Otto | |
| 5,760,569 A | 6/1998 | Chase, Jr. | |
| 5,799,909 A | 9/1998 | Ziegler | |
| 5,868,357 A | 2/1999 | Gabriel | |
| 6,179,357 B1 | 1/2001 | Gabriel | |
| 6,310,771 B1 | 10/2001 | Chien | |
| 6,554,151 B1 | 4/2003 | Brennan | |
| 6,674,052 B1 | 1/2004 | Luo | |
| 7,509,995 B2 | 3/2009 | Bhatti et al. | |
| 7,631,444 B1 | 12/2009 | Hursen | |
| 7,635,065 B1 | 12/2009 | Pettinger | |
| 9,027,777 B1 | 5/2015 | Steidinger, III | |
| 9,033,281 B1* | 5/2015 | Adams ................... | B64U 50/14 244/190 |
| 9,280,038 B1 | 3/2016 | Pan et al. | |
| 9,387,928 B1 | 7/2016 | Gentry et al. | |
| 9,412,280 B1 | 8/2016 | Zwillinger et al. | |
| 9,527,605 B1 | 12/2016 | Gentry et al. | |
| 9,650,133 B2 | 5/2017 | Fisher et al. | |
| 9,676,481 B1 | 6/2017 | Buchmueller | |
| 9,688,404 B1 | 6/2017 | Buchmueller et al. | |
| 9,957,048 B2 | 5/2018 | Gil | |
| 9,969,494 B1 | 5/2018 | Buchmueller et al. | |
| 9,981,745 B2 | 5/2018 | Gil | |
| 10,040,370 B2 | 8/2018 | Wei et al. | |
| 10,071,804 B1 | 9/2018 | Buchmueller et al. | |
| 10,246,187 B2 | 4/2019 | Cantrell et al. | |
| 10,274,952 B2 | 4/2019 | Cantrell et al. | |
| 10,435,156 B2 | 10/2019 | Bellof et al. | |
| 10,640,214 B2 | 5/2020 | Lopez et al. | |
| 10,807,714 B2 | 10/2020 | Atchley et al. | |
| 10,836,406 B2 | 11/2020 | Lum et al. | |
| 10,899,449 B2 | 1/2021 | Luckay et al. | |
| 11,187,200 B1 | 11/2021 | Kolbe et al. | |
| 11,225,325 B1 | 1/2022 | Evans, II | |
| 11,345,051 B2 | 5/2022 | Zheng et al. | |
| 11,453,498 B2 | 9/2022 | Martens | |
| 11,667,383 B2 | 6/2023 | Evans, II | |
| 2005/0000967 A1 | 1/2005 | Najd | |
| 2005/0023284 A1 | 2/2005 | Heiberg et al. | |
| 2008/0083756 A1 | 4/2008 | Daniels | |
| 2014/0091172 A1* | 4/2014 | Arlton ................... | B64U 50/19 244/17.23 |
| 2014/0180914 A1 | 6/2014 | Abhyanker | |
| 2015/0197389 A1 | 7/2015 | Bao et al. | |
| 2016/0068264 A1 | 3/2016 | Ganesh et al. | |
| 2016/0140851 A1 | 5/2016 | Levy et al. | |
| 2016/0257423 A1 | 9/2016 | Martin | |
| 2017/0015415 A1 | 1/2017 | Chan et al. | |
| 2017/0029101 A1* | 2/2017 | Weissenberg ........ | B64U 30/299 |
| 2017/0038116 A1 | 2/2017 | Ros | |
| 2017/0217323 A1 | 8/2017 | Antonini et al. | |
| 2017/0313421 A1 | 11/2017 | Gil | |
| 2017/0316375 A1 | 11/2017 | Gil | |
| 2017/0349039 A1 | 12/2017 | Rayner et al. | |
| 2017/0368959 A1 | 12/2017 | Hara et al. | |
| 2018/0002015 A1 | 1/2018 | McCullough et al. | |
| 2018/0062225 A1 | 3/2018 | You et al. | |
| 2018/0105063 A1 | 4/2018 | Wei et al. | |
| 2018/0160525 A1 | 6/2018 | Satake et al. | |
| 2018/0265222 A1 | 9/2018 | Takagi | |
| 2018/0312069 A1 | 11/2018 | Mcclymond | |
| 2018/0370618 A1 | 12/2018 | Harris | |
| 2019/0144007 A1 | 5/2019 | Lum et al. | |
| 2019/0291865 A1 | 9/2019 | O'donnell | |
| 2020/0047353 A1 | 2/2020 | Zheng et al. | |
| 2021/0197982 A1 | 7/2021 | Sweeny et al. | |
| 2021/0229903 A1 | 7/2021 | Goines, Jr. | |
| 2022/0035381 A1 | 2/2022 | Okuno et al. | |
| 2022/0134899 A1 | 5/2022 | Eide et al. | |
| 2022/0315209 A1 | 10/2022 | Gil et al. | |
| 2022/0315222 A1 | 10/2022 | Gil et al. | |
| 2022/0315246 A1 | 10/2022 | Gil et al. | |
| 2023/0008634 A1 | 1/2023 | Kabakov et al. | |
| 2023/0060684 A1 | 3/2023 | Bell | |
| 2023/0063715 A1 | 3/2023 | Bell | |
| 2023/0131957 A1 | 4/2023 | Lowenberg et al. | |
| 2024/0387930 A1 | 11/2024 | Bell | |

FOREIGN PATENT DOCUMENTS

| | | |
|---|---|---|
| CN | 110398983 A | 11/2019 |
| CN | 110963033 A | 4/2020 |
| CN | 112230672 A | 1/2021 |
| CN | 113183824 A | 7/2021 |
| DE | 102017209263 A1 | 12/2018 |
| EP | 1993940 A1 | 11/2008 |
| EP | 2644438 A2 | 10/2013 |
| EP | 2868577 A1 | 5/2015 |
| EP | 3177528 A1 | 6/2017 |
| FR | 2685547 A1 | 6/1993 |
| FR | 3075170 A1 | 6/2019 |
| JP | 53-45890 A | 4/1978 |
| JP | 1-176720 A | 7/1989 |
| JP | 2017-083063 A | 5/2017 |
| JP | 6176309 B2 | 8/2017 |
| KR | 10-1778883 B1 | 9/2017 |
| KR | 10-2019-0069968 A | 6/2019 |
| KR | 10-2021105 B1 | 9/2019 |
| KR | 10-2023-0164329 A | 12/2023 |
| WO | 95/21361 A1 | 8/1995 |
| WO | 2015/061008 A1 | 4/2015 |
| WO | 2015/158394 A1 | 10/2015 |
| WO | 2015/158934 A1 | 10/2015 |
| WO | 2016/019978 A1 | 2/2016 |
| WO | 2020/184166 A1 | 9/2020 |
| WO | 2020/235744 A1 | 11/2020 |
| WO | 2021/101735 A1 | 5/2021 |

OTHER PUBLICATIONS

Notice of Allowance received for U.S. Appl. No. 17/711,730, mailed on Oct. 1, 2024, 9 pages.

Non-Final Office Action received for U.S. Appl. No. 17/821,980, mailed on Mar. 13, 2024, 5 pages.

International Search Report and Written Opinion received for PCT Patent Application No. PCT/US2022/041727, mailed on Dec. 13, 2022, 21 pages.

International Preliminary Report on Patentability received for PCT Patent Application No. PCT/US2022/023688, mailed on Oct. 19, 2023, 11 pages.

(56) References Cited

OTHER PUBLICATIONS

International Preliminary Report on Patentability received for PCT Patent Application No. PCT/US2022/023690, mailed on Oct. 19, 2023, 9 pages.
International Preliminary Report on Patentability received for PCT Patent Application No. PCT/US2022/023692, mailed on Oct. 19, 2023, 08 pages.
International Search Report and Written Opinion received for PCT Patent Application No. PCT/US2022/023692, mailed on Jun. 21, 2022, 10 pages.
International Search Report and Written Opinion received for PCT Patent Application No. PCT/US2022/041701, mailed on Jan. 26, 2023, 15 pages.
Non-Final Office Action received for U.S. Appl. No. 17/818,848, mailed on Jan. 26, 2024, 13 pages.
International Search Report and Written Opinion received for PCT Patent Application No. PCT/US2022/040094, mailed on Dec. 1, 2022, 16 pages.
International Search Report and Written Opinion received for PCT Patent Application No. PCT/US2022/040477, mailed on Nov. 14, 2022, 14 pages.
International Search Report and Written Opinion received for PCT Patent Application No. PCT/US2022/023688, mailed on Jul. 12, 2022, 16 pages.
International Search Report and Written Opinion received for PCT Patent Application No. PCT/US2022/023690, mailed on Jun. 29, 2022, 14 pages.
International Search Report and Written Opinion received for PCT Patent Application No. PCT/US2022/023994, mailed on Jul. 14, 2022, 13 pages.
Final Office Action received for U.S. Appl. No. 17/887,812, mailed on Feb. 13, 2025, 20 pages.
Final Office Action received for U.S. Appl. No. 17/711,739, mailed on Apr. 16, 2025, 10 pages.
Notice of Allowance received for U.S. Appl. No. 18/788,975, mailed on Apr. 9, 2025, 8 pages.
Non-Final Office Action received for U.S. Appl. No. 17/887,812, mailed on Jun. 11, 2025, 19 pages.
Office Action received for Canadian Patent Application No. 3227086, mailed on Jun. 27, 2025, 5 pages.
Non-Final Office Action received for U.S. Appl. No. 17/711,739, mailed on Aug. 12, 2025, 9 pages.
Non-Final Office Action received for U.S. Appl. No. 19/000,216, mailed on Aug. 12, 2025, 6 pages.

* cited by examiner

PAYLOAD CONTAINER WITH POWER SUPPLY FOR UNMANNED SYSTEMS

RELATED APPLICATIONS

This application claims the benefit of priority to U.S. Provisional Application No. 63/171,336, filed Apr. 6, 2021, entitled "Pneumatic Platform and Payload Containers for Unmanned Aerial Vehicles." This application further claims the benefit of priority to U.S. Provisional Application No. 63/237,392, filed Aug. 26, 2021, entitled "Pneumatic Platform and Payload Containers for Unmanned Aerial Vehicles." Each of the aforementioned applications is expressly incorporated herein by reference in its entirety.

BACKGROUND

Unmanned Aerial Vehicles (UAVs) are used to deliver goods. Some UAVs are being used to commercially to deliver parcels. Sometimes the majority of deliveries performed by UAVs include relatively small, light parcels.

UAVs have operated using several different power sources. Some examples include liquid fuel gasoline engines, solar panels, batteries, and fuel cells. Battery power sources are the most common power source for UAVs. Battery technology has advanced to the point where UAVs can use batteries to fly over long distances. One benefit to using batteries as a power source is that a battery can be charged while the UAV is not in use. Moreover, charged batteries can be swapped with depleted batteries to provide the UAVs with a near constant source of power with little delay.

SUMMARY

At a high level, aspects described herein relate to a case and a payload container for carrying loads by an Unmanned Aerial Vehicle (UAV). The case includes a battery pack that, when the case is secured to the UAV, is configured to provide a power source for the UAV. Some aspects described herein relate to the case where the battery pack that can be wrapped around a cylinder portion of the case with a hollow core where the goods are stored. Some aspects described herein related to a payload container designed to attach to the case. The payload container has a cushioned bumper at the front to soften the impact of the case when inserted. The payload container or the outer wall of the payload container includes a front end that is closed and curved and a rear end that is open and includes seals and clamps that lock the case into place.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

UAVs are utilized for delivering items, including parcels and laboratory samples. When delivering items using UAVs it can be beneficial for the UAV to have multiple power sources during transit. The present disclosure provides systems and methods that improve aspects of item delivery using UAVs. Some aspects are also particularly useful for delivering items such as blood or lab samples across healthcare institutions with a decrease in the amount of times needed to stop deliveries to charge the UAV.

One of the disclosed technologies relates to some embodiments of a payload container that can be attached and used to transport a load using a UAV. Also disclosed are some embodiments of cases that can attach to the payload container. In some embodiments, the cases can fit inside the payload container. The payload container is designed to hold in the case.

One of the disclosed technologies relates to battery charges in the case and/or payload container that can allow the UAV to continue flight. In some implementations, the case and/or container includes a battery for the UAV. Thus, the case and/or payload container can be loaded with an item and provided to the UAV, and the UAV may then use the battery associated with the case and/or payload container to power it to its delivery location. The benefit of this design is that it allows an item to be provided to a UAV for delivery with a charged battery, reducing the number of components needed by the UAV for delivery. At the same time, the battery of the case and/or payload container can be conveniently charged, while awaiting an item for delivery. Once the item is placed within the case and/or payload container, the payload container is loaded or attached onto the UAV, which then has sufficient battery power to begin delivering the item.

It will be understood that, although the disclosure describes the technology in conjunction with UAVs, some technologies described herein are also suitable for use with ground vehicles (e.g., Unmanned Ground Vehicles (UGVs)) or manned vehicles. As such, the disclosed technology should not be limited to only applications involving UAVs, but instead, it should be more broadly interpreted for use with other applications where practical.

Various terms are used herein to describe various embodiments. Although the terms are described throughout, a brief overview of some of the terms is provided to facilitate an understanding of the present technology.

Figure 1:
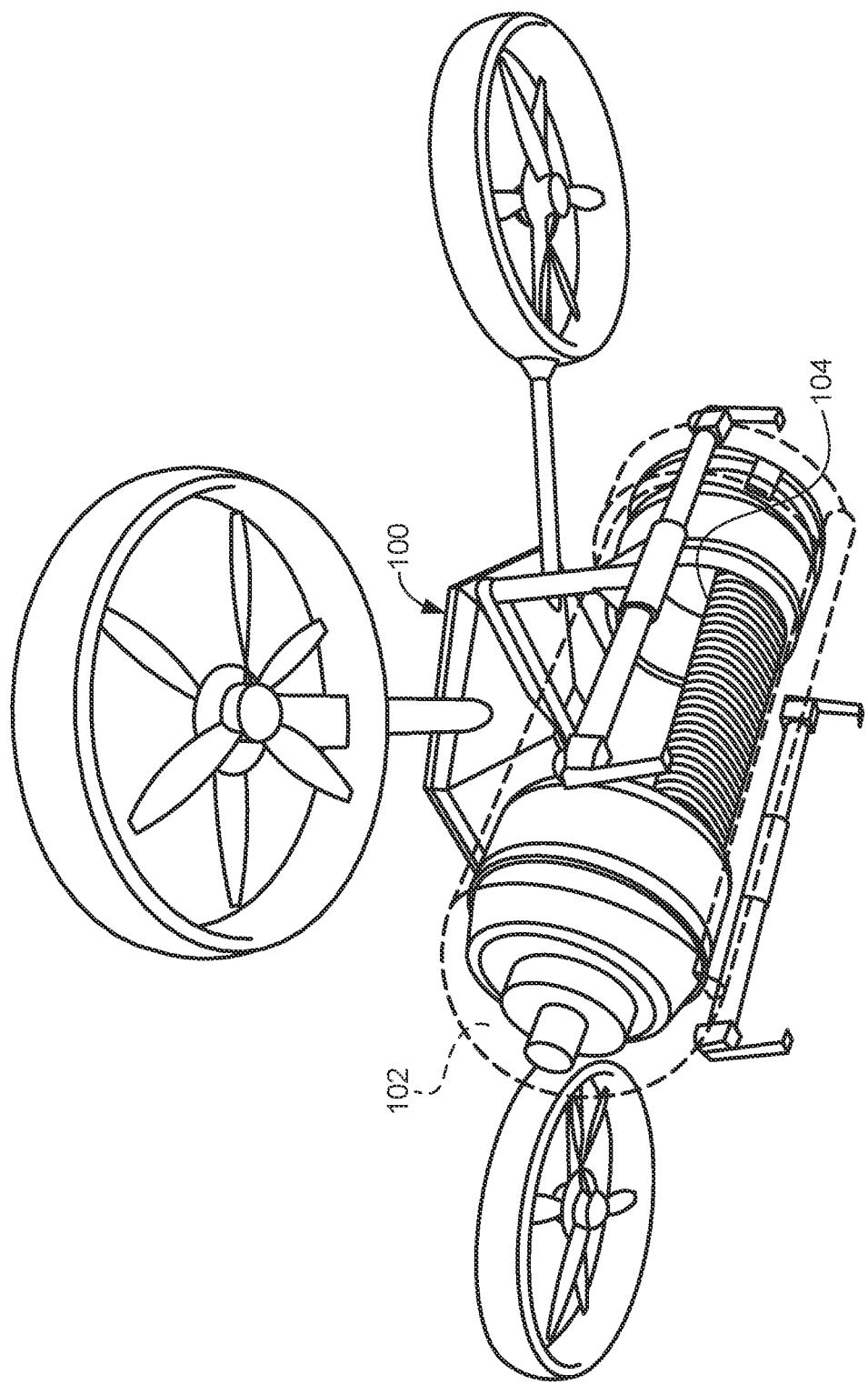
FIG. 1 is an exemplary UAV for carrying payloads, in accordance with an embodiment described herein.

With reference now to the figures, FIG. 1 illustrates an exemplary UAV for carrying payloads, in accordance with an embodiment described herein. The UAV 100 comprises a payload container 102 coupled to UAV 100, and illustrated within payload container 102 is a case 104, which can be delivered from or to a pneumatic delivery system. It should be understood that coupled to means that the payload container 102 may be permanently affixed or releasable affixed to UAV 100, or may be integrally formed as part of UAV 100. In one example, the payload container 102, the case 104, or portions of the UAV 100 or any combination of them include a battery pack. In one example, the case 104 has terminals on either end that electrically connect it with leads within the payload container 102. In another example, the case 104 electrically connects wirelessly to the payload container 102 and/or the UAV 100. In one example, the payload container 102 is connected to a power distribution component of the UAV 100. In another example, either the payload container 102 or the case 104 or both wirelessly connect to electrical components in the UAV 100. The case 104 can be separately charged and used to hold items. In one example, whenever the case 104 is replaced in the UAV 1000, it can provide the UAV 100 with a fully charged battery with each new delivery. In one example, this can save time between deliveries since the UAV 100 may not need to recharge after every activity or delivery. In another example, the UAV 100 also may not need to stop midway in between a delivery to recharge.

Figure 2:
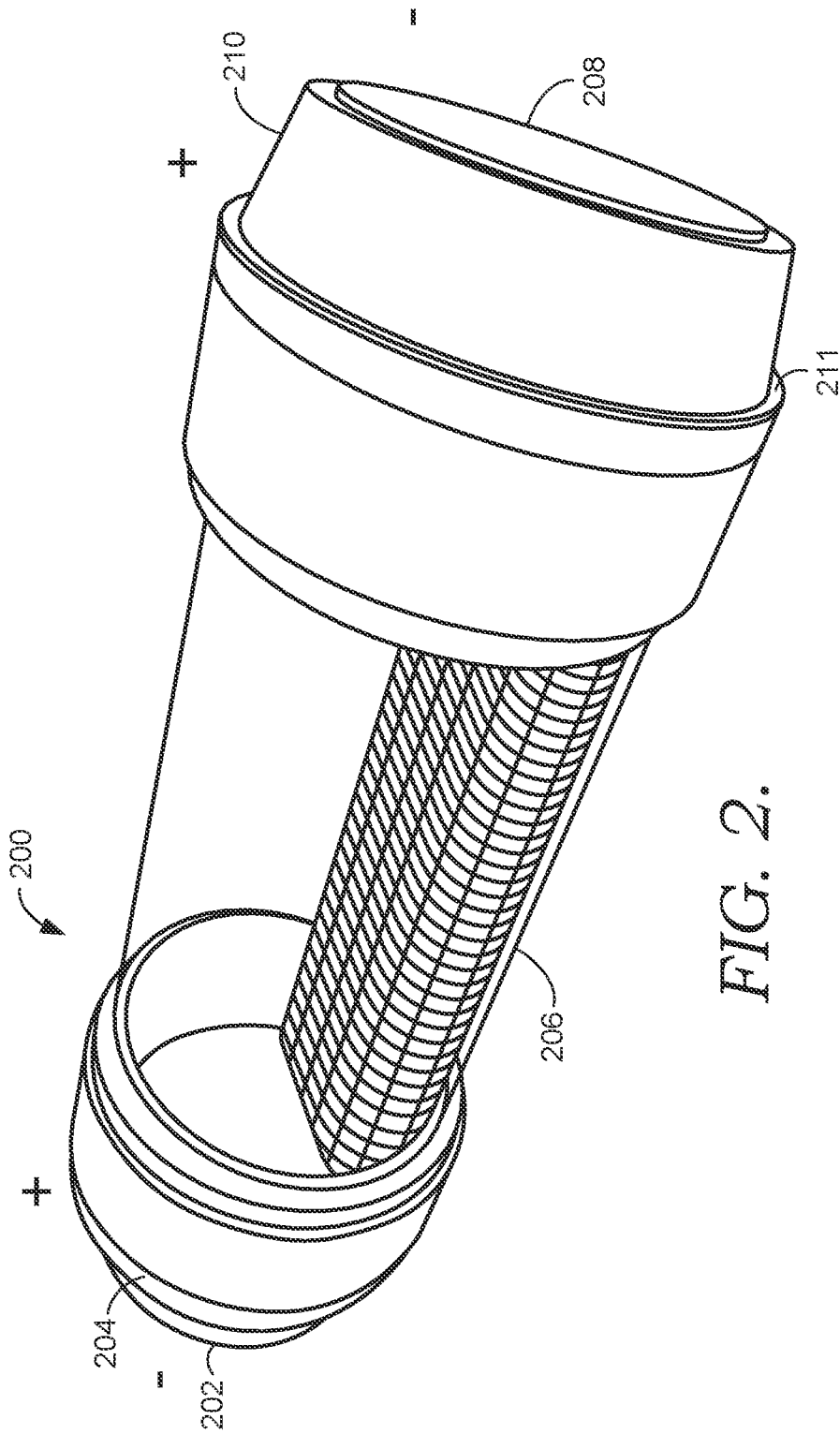
FIG. 2 is an exemplary case, in accordance with an aspect described herein.

As illustrated in FIG. 2, an exemplary case 200 is depicted for use in implementing embodiments described herein. In one embodiment, case 200 comprises a first end 202. The first end 202 comprises a first cap 204 and a first opening. A second end 208 comprises a second cap 210 and a second opening. One or more of the caps 204, 210 can be opened to access the space inside the case 200. For example, one or more of the caps 204, 210 can be used to place or remove a load from the case 200, to place or remove or access the battery pack 206, to place or remove or access any other component of the case 200. In another example, the outer wall of the case can be opened to access the space inside the case 200 or any load placed inside the case 200. The second opening may be smaller than the first opening. In one embodiment, a battery pack 206 can provide a power source for the UAV when the case 200 is secured to the UAV. The first cap 204 and second cap 210 can each comprise at least one metal connector for delivering power to the UAV. The caps 204, 210 or other locations in the case 200 may also include devices such as house sensors (e.g. temperature, shock, GPS), rewritable RFID tags or any other sensors or devices which can be read or detected or which provide signals, communication devices such as, but not limited to IoT, BLE, LoRa, WIFI, LEDs to show battery charge level, displays such as an e-ink display, devices and/or displays that provide location, distance, or direction to different battery rechargeable stations, location of the UAV, the destination location, the origin location, weather components, or the like, or a combination. In one example, the first cap 204 and/or the second cap 210 of the case 200 connect to a portion of the payload container. For example, the first cap 204 and/or the second cap 210 can connect to portion of the payload container so that there is electrical connection from the battery pack 206 in the case 200 to the payload container and/or the UAV. In some embodiments, the case 200 includes additional connectors such as a metal ring 211 outside the case 200. In one example, the metal ring 211 is located on either end 202, 208 of the case 200. In another example, the metal ring 211 is located in one or the other end 202, 208 of the case 200. It should be understood that a metal ring 211 can be located anywhere else externally in the case 200 and can be a ring or a straight line or any other shape. In some embodiments, the metal ring 211 can electrically connect to the payload container. For example, the metal ring 211 can connect to a clamp in the payload container. The metal ring 211 can be a narrow metallic rim.

In one example, one end 202, 208 of the case 200 is a positive terminal and the other end is a negative terminal. For example, the first end 202 of the case 200 is a positive terminal and the second end 208 of the case 202 is a negative terminal. It should be understood that the poles of the terminals can be different or can be interchanged between the first end 202 and the second end 208. As illustrated in FIG. 2, each side can have a positive and negative terminal. For example the ends 202, 208 are negative terminal, but the inner caps or inner portion of the case are positive terminal. It is understood that this can be interchanged as well. In one example, the first end 202 and the second end 208 are symmetrical so that any end 202, 208 of the case 200 can be connected to any end or any side of the payload container. For example, the first end 202 and a second end 208 can be symmetrical to allow the case 200 to be inserted or connected or attached in any direction to the payload container to allow the battery pack 206 to charge multiple devices in or outside the UAV and/or be charged from multiple devices in or outside the UAV.

In one example, the battery pack 206 may be wrapped around at least a portion of case 200. For example, the battery pack 206 can be wrapped around the cylinder portion of the case 200 such that there is a hollow core in the case 200 where a load can be placed or stored. In one example, the battery pack 206 can be placed in part of the storage area of the case 200 where a load can be placed. In one embodiment, the battery pack 206 is housed in at least one of either the first end 202 or the second end 208 of the case 200. In one example, the battery pack 206 can be placed inside either the first cap 204 or the second cap 210 or both. A portion of batteries in the battery pack 206 can be rechargeable or non-rechargeable. It should be understood that any battery pack 206 can be used, for example, battery packs 206 where a portion of the batteries is non-rechargeable, battery packs 206 where a portion of the batteries is rechargeable, or any battery having any technology for storing energy or power or the like or a combination. It should be understood that a portion of the batteries in the battery pack 206 can be wireless or use any technology that provides power. In one example, each of the case 104 can be separately charged using the battery pack 206 and ready to be used in a payload container with a fully charged battery. The battery pack 206 can be embedded or not embedded. In one embodiment, the battery pack 206 acts as a main power source for the UAV. In another example, the battery pack 206 either supplements the power to UAV or supplies power to a portion of the components and/or devices on the UAV or any external device to the UAV. In another example, external sources of power (either connected to the UAV or external to the UAV) can be used to recharge the battery pack 206 either in flight or when it is not in flight. The battery pack 206 can be any shape, for example, it could be wrapped around the cylinder portion of the container, with a hollow core where the goods are stored, taking up part of the cylinder storage or housed inside either or both caps. It should be understood that the battery pack 206 can be of any shape such as sphere, cylinder, cone, cube, cuboid, hexagonal prism, square-based pyramid, tetrahedron, triangular prism, or any structure with one or more faces that are curved, or the like, or a combination. It should be understood that the case 200 can also be of any shape such as sphere, cylinder, cone, cube, cuboid, hexagonal prism, square-based pyramid, tetrahedron, triangular prism, or any structure with one or more faces that are curved, or the like, or a combination or even change shapes based on the load being carried, the battery pack 206, the shape of the payload container, or the like, or a combination.

Turning now to FIGS. 3A, 3B, 3C, and 3D, exemplary payload containers 300 are depicted for use in implementing embodiments described herein. In one embodiment, the payload container 300 is designed to attach to the case 200. In other embodiments, the case 200 can be inserted inside the payload container 300. It should be understood that in some embodiments, the payload container 300 includes a battery pack and does not need to attach to a case 200. For example, a load can be placed inside the payload container 300 that includes one or more battery packs and a case 200 may not be needed.

In one embodiment, the payload container 300 comprises an outer wall surrounding a chamber. The case 200 or the load can be placed inside this chamber 300. The outer wall can be cylindrical or of any other shape. The payload container 300 can have a front end 304 and a rear end 302. The rear end 302 is configured to receive a case 200. In one embodiment, the payload container 300 comprises a rear end 302 configured to couple to the UAV. It should be understood that any portion of the payload container 300 can be designed to couple to the UAV.

In one embodiment, a front electrical lead 314, 348 and a rear electrical lead 320 are configured to connect to the battery pack 206 of the case 200 and/or a power distribution board of the UAV. For example, the front electrical lead 314, 348 and rear electrical lead 320 can form an electrical connection to the battery pack 206 of the case 200 and/or a power distribution board of the UAV or any electrical component of the UAV. In one example, the front electrical lead 314, 348 is configured to connect to the battery pack and the rear electrical lead 320 is configured to connect to a power distribution board of the UAV In one example, the front electrical lead 314, 348 can connect to the positive terminal in the case 200 (illustrated towards the first end 202 of the case 200) and the rear electrical lead 320 can connect to the negative terminal in the case (illustrated towards the second end 208 of the case 200). It should be noted that either the front electrical lead 314, 348 in the first end 202 or the rear electrical lead 320 in the second end 208 can be designated the positive or negative terminal. In one example, the case 200 can have a first end 202 and a second end 208 that can connect to any of the front electrical lead 314, 348 or the rear electrical lead 320. For example, the first end 202 and a second end 208 can be symmetrical to allow the case 200 to be inserted in any direction inside the payload container 300. When the case 200 is inserted in any direction inside the payload container 300, the battery pack 206 of the case 200 can electrically connect to the payload container 300 and/or any electrical component on the UAV and/or the UAV and/or any electrical component or device external to the UAV.

In one example, the payload container 300 further includes clamps 320, 316 such as, but not limited to spring loaded clamps. For example, the payload container 300 contains three spring load clamps 354, 358, 360 as further illustrated in FIG. 3B. It should be understood that the payload container 300 can include more or less spring load clamps or any other method that can assist in electrically connecting the payload container 300 with the case 200 and/or components or devices in the UAV and/or retaining the case 200 or any other structure inserted or attached to the payload container 300. In one example, one or more of the clamps 354, 358, 360 can be designed to retain that the case 200 so that it does not slip back out even if the payload container 300 is subject to force such as vibration, inclination, or any other force acting on the payload container 300. Additionally or alternatively, one or more of the clamps 354, 358, 360 can also act as an electrical connector to an electrical component of the UAV or to an external electrical component. Additionally or alternatively, one or more of the clamps 354, 358, 360 can also include electrical components, sensors, electrical devices, or the like.

Figure 3A:
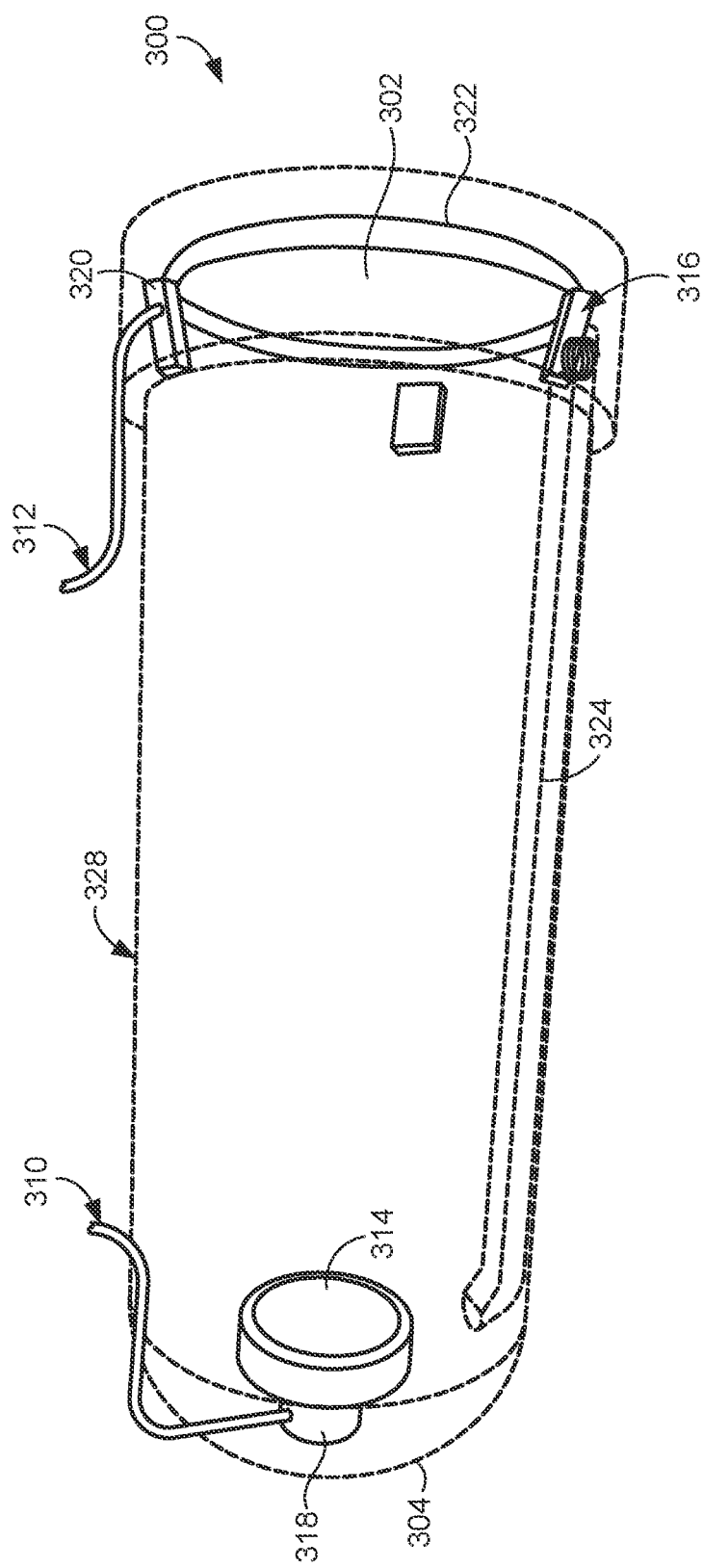
FIGS. 3A, 3B, 3C, and 3D are exemplary payload containers suitable for transporting the case of FIG. 2, in accordance with an aspect described herein.

With further reference to FIG. 3A, in one example, one or more of the clamps 320, 316 can be made out of metallic or any other material and can connect to a wire 312. A bumper 314, 348 attached to a front electrical lead 314, 348 can connect to another wire 310. It should be understood that any other technology can be used to electrically connect the battery pack 206 to the payload container 300 and/or components or devices in the UAV. In one example, external connections of the case 200, such as the metal ring 211 connects to one or more clamps 320, 314 or the bumper 318, 348 to allow for electrical connection. In another example, a metal component located in any portion of the case 200 can allow for electrical connection any location of the payload container 300. In another example, the metal ring 211 of the case 200 touches one or more of the clamps 320 connected to wire 312 for the positive terminal. For example, the payload container 300 and/or components and devices in the UAV can contain sensors or devices to wirelessly connect with the battery pack 206 of the case 200 to allow for electrical connection. In another example, the payload container 300 and/or components and devices in the UAV can contain pads or devices that allow them to electrically connect with the battery pack 206 of the case 200. In one embodiment, the payload container 300 includes a seal 322. The seal 322 can be made of any material such as foam, rubber or the like. It can be located in any location inside or outside the payload container 300, inside or outside cases 200, or any other device that is inserted or attached to the payload container 200. In one example, the seal 322 can be located in the rear end 302 of the payload container 300 to help create a vacuum, closing any opening against the case 200.

Figure 3B:
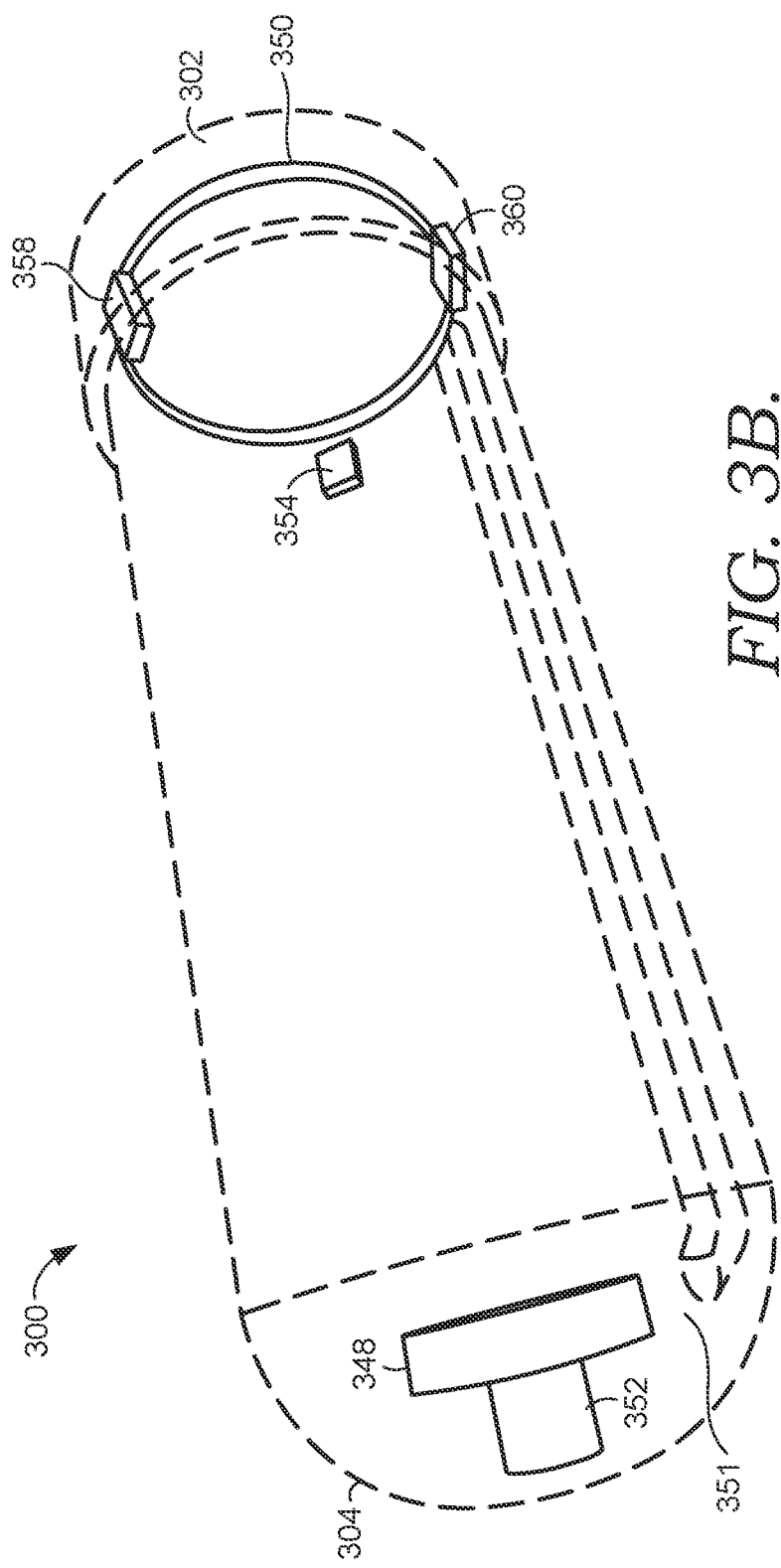

With further reference to FIG. 3B, the payload container 300 includes a bumper 352 at a front end 304 and one or more clamps 354, 358, 360 on the rear end 302 where a case 200 can be attached or inserted. In one example, the bumper 352 can attach to a front electrical lead 348. For example, as illustrated in FIG. 3A, a wire 310 connected to the front electrical lead 314, 348 protrudes through a bumper 318 and a wire 312 connected to the rear electrical lead 320 protrudes through a clamp 320 or a retaining clamp 320. The payload container 300 can include a seal 350 at one or more ends of the payload container 300.

Figure 3C:
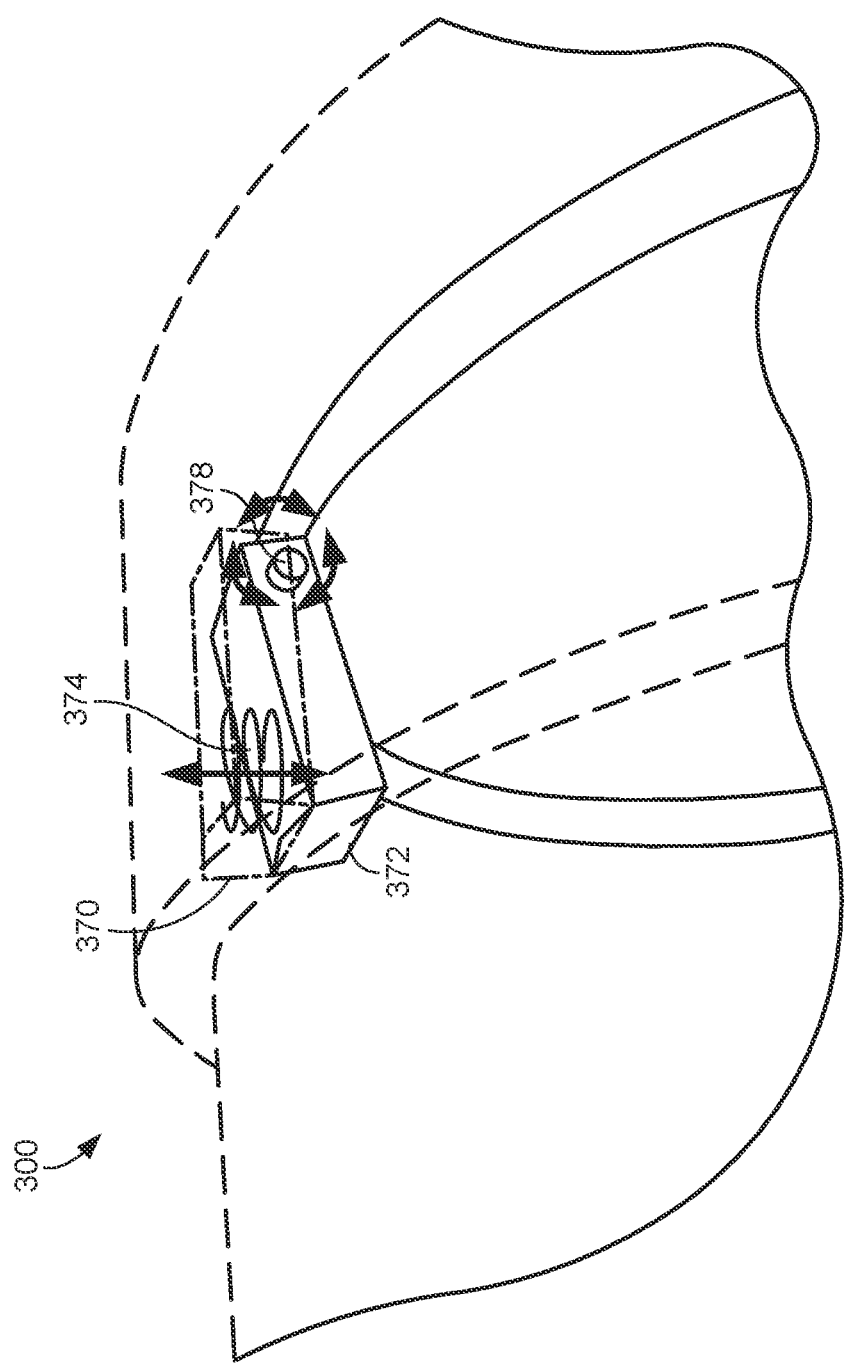

With further reference to FIG. 3C, one or more clamps 320 can be designed to move or rotate or pivot between an open clamp position 372 and a recessed clamp position 370. The one or more clamps 320 include a spring 372 or any other device that can allow the clamp 320 to move between the different positions. In one example, the clamps 320, 316 have a bias towards the center of the payload container 300 as defined by the outer wall of the payload container 300. When a case 200 is inserted into the payload container 300, the clamps 320, 316 hold the case 200 within the payload container 300 due to the bias. The clamps 320, 316 can be depressed against the bias to release the case 200. When a case 200 or any other structure is inserted inside or attached to the payload container 300, the case 200 can push the clamp from an open clamp position 372 to the recessed clamp position 370. The recessed clamp position 370 allows the payload container 300 to lock or hold or retain in the case 200 or any other structure inserted inside or attached to the payload container 300. In one example, the insertion of the case 200 can push the one or more clamps 354, 358, 360 into a recessed position. In one example, when the thickest portion of the case 200 goes through the payload container 300, the springs 374 push the clamps 320 back into the payload container 300 space and the case 200 cannot get back out. One or more clamps 354, 358, 360 can include a pivot structure 378 such as a pin to allow the clamp 354, 358, 360 to pivot from a pivot point. This pivot structure 378 can rotate to allow the clamp 354, 358, 360 to rotate or pivot about the pivot point. The pivot structure 378 can also allow the clamp 320 to attach to the body of the payload container 300. The clamps 320, 316 can be designed to be wide enough and/or long enough to allow the case 200 to be retained inside the payload container 300. In one example, one or more clamps 320 include a rear electrical lead 320 that allow the electrical connections in the payload container 300 and/or the case 200 to electrically connect to devices or electrical components outside the payload container 300. In some examples, multiple spring loaded clamps 354, 358, 360 lock the case in place and prevent it from bouncing out.

Figure 3D:
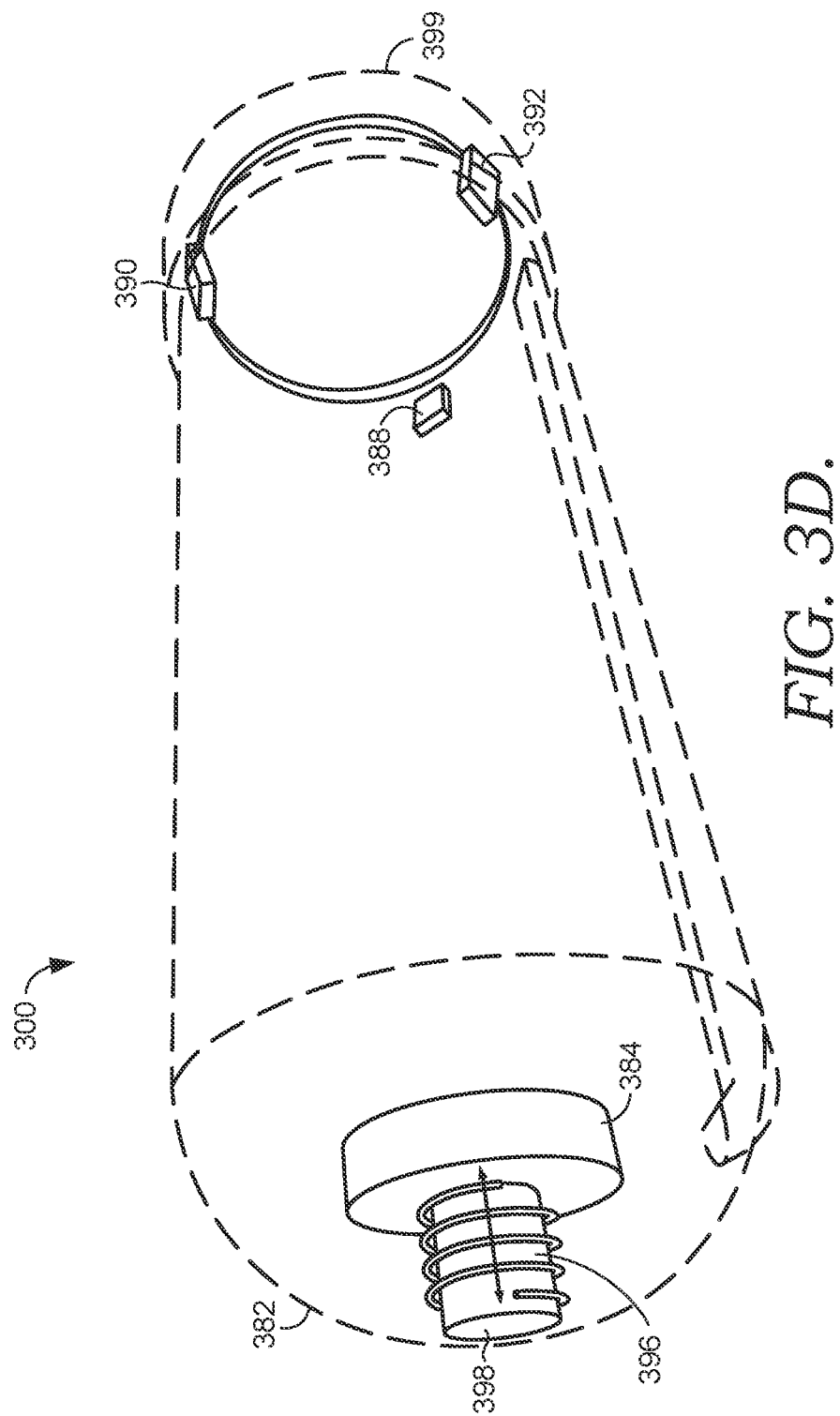

With further reference to FIG. 3D, the bumper 396, 398 along with the front electrical lead 384 presses or pushes or touches or connects the case 200 against the one or more clamps 388, 390, and 392. When a case 200 or another structure is inserted inside the payload container 300, the bumper 396, 398 moves forwards and backwards along a horizontal line between the compressed position and a non-compressed position. In the compressed position, springs 396 or any other structure compress a coil or any structure 398 capable of being compressed and the edge of the bumper structure 384 exerts pressure against the case 200. In one example, a pressure holds the case 200 in place. The case 200 is also held in place since it compresses the clamps 388, 390, 392 at the rear end 399 and can ensure contact with both front electrical lead 314, 348 and rear electrical lead 320. In one example, the bumper 396, 398 is designed to push or press or touch or attach or connect with the case 200 that is locked in or retained by the clamps 388, 390, 392 to allow the metal ring 211 of the case 200 to touch one of the clamps 388, 390, 392 such as the top clamps 390. When the metal ring 211 of the case 200 touches one or more of the clamps 388, 390, 392, an electrical connection can close between the case 200, payload container 300 and/or external devices. In one example, the bumper structure 396, 398 consists of the bumper 396, 398 along with the first electrical lead 384. It should be understood that the bumper can also be referred to as the bumper structure.

In some embodiments, the rear electrical lead 320 is a metal spring loaded clamp within the payload container 300. The front electrical lead 314, 348 is a metal pad inside of the payload container 300. The front electrical lead 314, 348 can communicate with electrical connections that correspond to the positive terminal 310 extending out of the payload container 300. The rear electrical lead 320 can communicate with electrical connections that corresponds to the negative terminal 312 extending out of the electrical connections. In some embodiment, the electrical leads 314, 348, 320 communicates with a power distribution board of the UAV or any other electrical device or component of the UAV. In some examples, a wire 310 connected to front electrical lead 314 protrudes through a bumper 318 and a second wire 312 is connected to rear electrical lead 320 attached to one or more clamps 320. In one example, wires can be used to enable electrical connections in the payload container 300, but it should be understood that one or more electrical connections can be wireless or wired or any use any technology to transmit electricity or magnetism or power.

As further illustrated in FIGS. 3A, 3B, 3C, and 3D, the payload container 300 can comprise a rear end 302 configured to receive the payload container 200. In some examples, the front end 304 is rounded to form a rounded chamber 351 in the front end 304. In one example, the payload container 300 can include one or more seals 322, 350, for example but not limited to rubber seals 322, 350. The seal 322, 350 can allow to achieve vacuum in one or more portions of the payload container 300. For example, the seal 322, 350 can form a vacuum within the rounded chamber 351 in the front end 304. In other examples, the seal 322, 350 allows for an airtight connection. In other examples, the seal 322, 350 allows for a waterproof connection or a temperature controlled connection or the like. The seal 322, 350 could also be used to ensure the snugness or fitting in cases 200 or other structures inserted inside the payload containers 300, where the cases 200 or these other structures are of different shapes and do not snugly fit inside the payload container 300. The seal 322, 350 can expand or contract to push the case 200 inside the payload container 200 so that it does not move during the flight of the UAV or any activity involving the UAV and/or the payload container 300.

The seal 322, 350 can be made of any material such as foam, rubber or the like. The seal 322, 350 can be located in any location inside or outside the payload container 300, inside or outside cases 200, or on any structure that is inserted or attached to the payload container 200. In one example, the seal 322, 350 can be located in the back of the payload container 300 to help create a vacuum, closing any opening against the case 200. In one example, the payload container 300 has a cushioned bumper at the front to soften the impact of the case when inserted. In one example, the payload container includes a front end 304 that is curved for aerodynamic performance and a rear end 302 that includes a seal 322 and one or more clamps 320, 316 to allow the case to lock into place inside the payload container.

In one embodiment, the payload container 300 is designed so that the opening of the payload container 300 at the rear end 302 is wider than the diameter of the inner cylinder 328 of the payload container 300. This may allow the rear end 302 to look like a funnel since it is wider outside the payload container 300 and narrower when it reaches the inner cylinder 328 of the case 200. In one example, in the rear end 302, the width of the payload container 300 in the rear end 302 is wider than the width of the inner cylinder 328 of the payload container 300. This structure can be referred to as a case funnel. It can assist the payload container 300 to funnel the case 200 into another container, pipe or tabular structure, for example but not limited to the payload container 300. It can also allow for any structure, a pipe, or any tabular structure narrower than the width of the rear end 302 to slide in and collapse the clamps.

It should be understood that the rear end 302 and the front end 304 can be either open or closed or be any shape such as curved, concave, convex, straight, having multiple curves, having no curves, or the like. In another example, a front end 304 that is closed and curved can allow for aerodynamic performance. In another example, the back end 302, which can be open, has a seal 322, 350 that can allow for an airtight connection. One or more clamps 320, 316 at the rear end can secure the case. In one example, the outer wall can be cylindrical. It should be understood that the outer wall can be of any shape such as part of a prism, part of a 3D structure having one or more curved faces, or the like. In one example, the payload container 300 has a bumper 318 in one of the ends, such as the front end 304. The bumper 318 within the chamber 351 at the front end 304 can secure the case 200 or hold the case 200 into place. In one example, if the bumper 318 is cushioned, it can be beneficial to soften the impact of the case 200 when inserted. In one example, a connector 324 can extend along the length of the payload container 300. The connector 324 may be an air hose or an air vent that can allow the main payload container 300 to push and pull on the case 200 without any additional airflow. It should be understood that the connector 324 can use any other technologies to push and pull the payload container 300 such use magnetism or electricity or air or water or the like.

Figure 4:
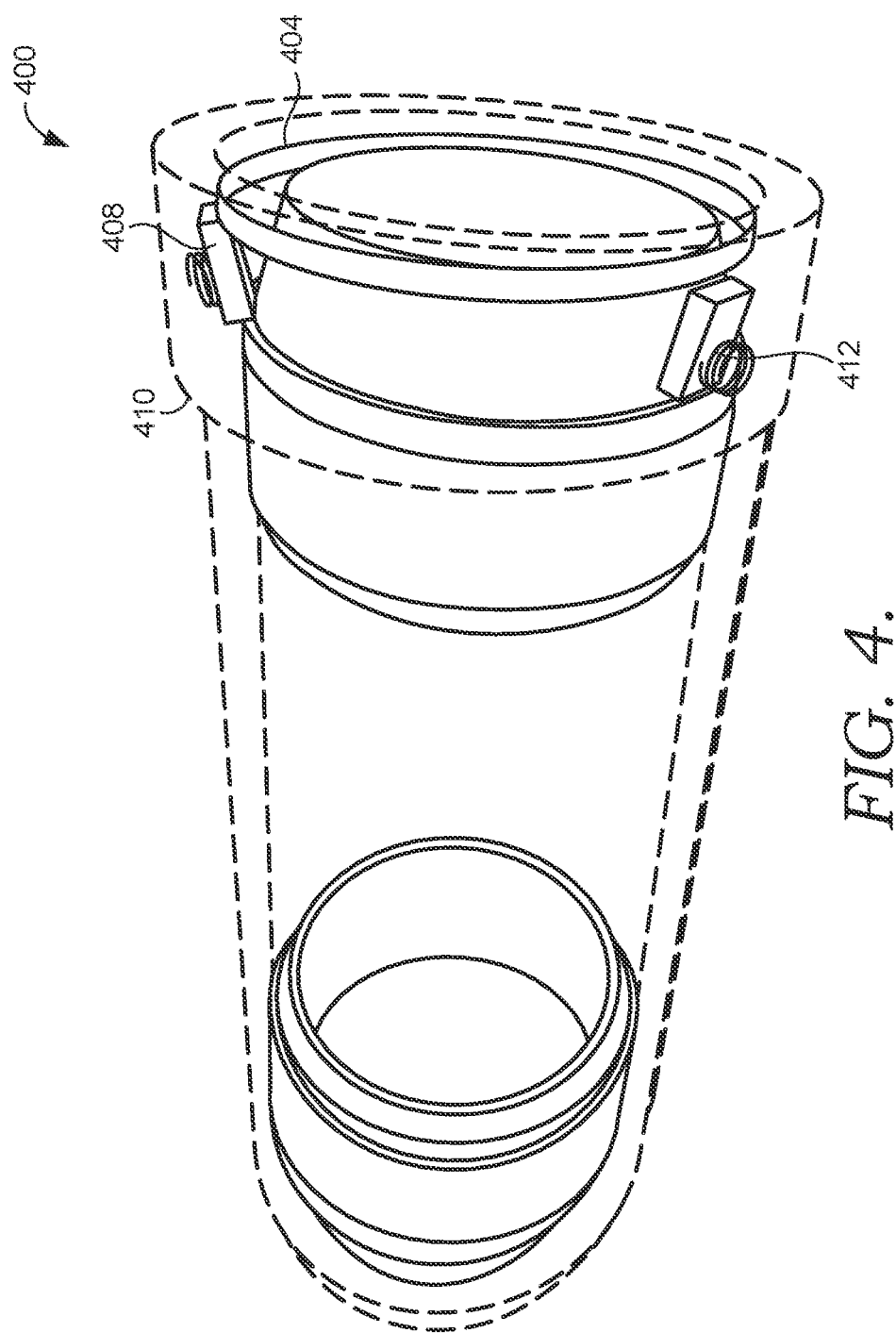
FIG. 4 illustrates an exemplary case inserted inside a payload container in accordance with an aspect described herein.

Turning to FIG. 4, an exemplary case 200 inserted inside a payload container 300 is depicted for use in implementing embodiments described herein. In one embodiment, the payload container 300 includes multiple springs 412 located on one or both sides of the payload container 300. In one example, the springs 412 in the clamps 408 bow up and fasten the case 200 in place when the case 200 attaches to the payload container 300 or is inserted inside the payload container 300. In one example, the insertion of the case 200 pushes the clamps 408 into their recessed position as illustrated in FIG. 4. As soon as the thickest portion of the case 200 goes through, the spring 412 push the clamps 408 back into the payload container 300 space and the case 200 cannot get back out. In some examples, the bumper in the front end of the payload container 300 pushes the case 200 against the clamps 408 and to allow the metal ring 211 to touch one of the clamps 408 such as the top clamp 408 which may allow for an electrical connection. The seal 404 allows the formation of vacuum within the rounded chamber in the front end 304. In one example, the seal 404 may not form a vacuum inside but may cause a difference in air pressure inside the chamber. The payload container 300 can use the difference in air pressure to move the case 200 in or out of the payload container 300. Other containers or tabular structures or pipe can also use difference in air pressure to move the case 200 in and out.

With further reference to FIG. 4, the payload container 300 is designed so that the opening of the payload container 300 at the rear end 302 is wider than the diameter of the inner cylinder 328 of the payload container 300. This may allow the rear end 302 to look like a funnel since it is wider outside the payload container 300 and narrows when it reaches the inner cylinder 328 of the payload container 300. Reference 410 illustrates an exemplary edge where the wider funnel portion towards the rear end of the payload container merges into the narrower portion of the payload container 300.

Figure 5:
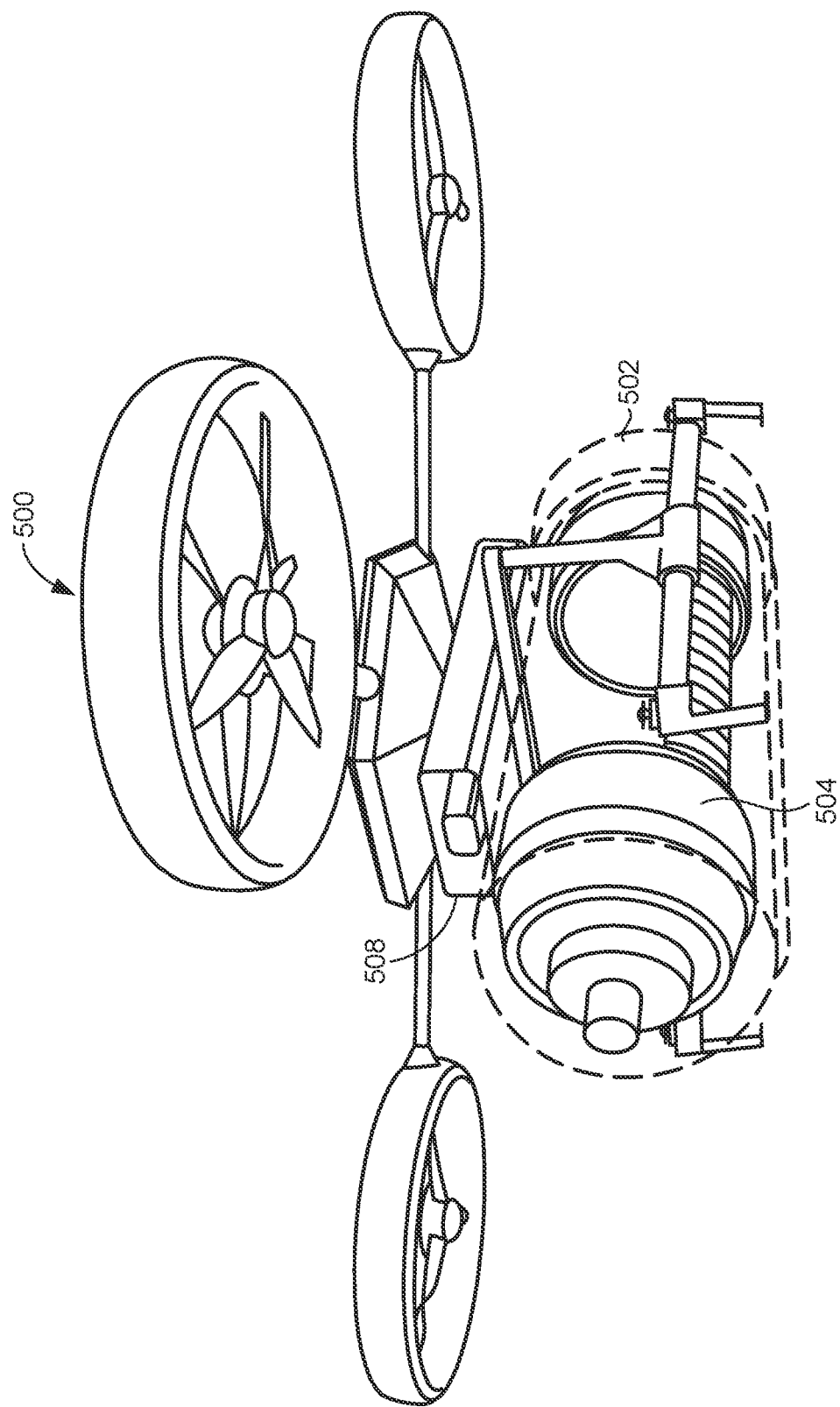
FIG. 5 illustrates an exemplary UAV for carrying payloads using a rechargeable battery pack, in accordance with an embodiment described herein.

FIG. 5 illustrates an exemplary UAV 500 for carrying payloads using a rechargeable battery pack 508, in accordance with an embodiment described herein. The UAV 500 comprises a payload container 502 coupled to UAV 100, and illustrated within payload container 502 is case 504, which can be delivered from or to a delivery system. The UAV 500 further includes a battery pack 508 that can be rechargeable. It should be understood that while a rechargeable battery pack 508 is illustrated in this example, any battery pack 508 can be used, for example, battery packs 508 where a portion of the batteries is non-rechargeable, battery packs 508 where a portion of the batteries is rechargeable, or can include any other technology for storing energy or power or the like or a combination.

In one embodiment, the battery pack inside the case 504 can use power from the battery pack 508 connected to the UAV to recharge during flight or during other times. In another embodiment, the battery pack 508 connected to the UAV can use power from the battery pack inside the case 504 to recharge during flight or during other times. In another embodiment, the battery pack inside the case 504 and the battery pack 508 connected to the UAV can recharge from external sources either during operation, during flight, or not in operation. In some embodiments, at least one of the UAV 500, the payload container 502, and the case 504 can determine how to allocate charge between the battery pack inside the case 504 and the battery pack 508 connected to the UAV when recharging.

In another example, at least one of the UAV 500, the payload container 502, and the case 504 can determine when to use power from the rechargeable battery 508 connected to the UAV or the battery pack connected to the case 504. In one example, a portion of the power from the rechargeable battery 508 connected to the UAV and another portion of the battery pack connected to the case 504 can be used to power any component or device on the UAV, the UAV itself, or devices external to the UAV. In another example, one or more devices in the UAV or external to the UAV can use either from the rechargeable battery 508 connected to the UAV or the battery pack connected to the case 504, or a combination. In another example, one or more devices in the UAV or external to the UAV can use either from the rechargeable battery 508 connected to the UAV or the battery pack connected to the case 504 until the power is depleted from the rechargeable battery 508 connected to the UAV or the battery pack and then use the rechargeable battery 508 connected to the UAV or the battery pack that still has charge.

Accordingly, described herein are various aspects of technology directed to systems for payload container with power supply for UAVs. It is understood that various features, sub-combinations, and modifications of the embodiments described herein are of utility and may be employed in other embodiments without reference to other features or sub-combinations. Moreover, the order and sequences of steps shown in the example flow diagrams are not meant to limit the scope of the present disclosure in any way, and in fact, the steps may occur in a variety of different sequences within embodiments hereof. Such variations and combinations thereof are also contemplated to be within the scope of embodiments of this disclosure.

In some embodiments, a case such as the case described in any of the embodiments above comprise, a first end comprising a first cap and a first opening and a second end comprising a second cap and a second opening. The case further comprises a battery pack that, when the case is secured to the UAV, is configured to provide a power source for the UAV. The case further comprises the first cap and the second cap each comprising at least one metal connector for delivering power to the UAV. Advantageously, these and other embodiments, as described herein, improve the way UAVs or devices within the UAVs or containers or cases within the UAVs operate in terms of computer resource consumption (e.g., power, CPU, memory, I/O, network latency) and efficiency.

In any combination of the above embodiments, the battery pack is wrapped around at least a portion of the case.

In any combination of the above embodiments, the battery pack is housed in at least one of the first end or the second end of the case.

In any combination of the above embodiments, the battery pack is embedded in the case.

In any combination of the above embodiments, a portion of batteries in the battery pack is rechargeable.

In any combination of the above embodiments, a first metal connector of the first cap is operably connected to a first connecter of a payload container.

In any combination of the above embodiments, a second metal connector of the second cap is operably connected to a second connector in a retainer clamp.

In any combination of the above embodiments, the second opening is smaller than the first opening.

In any combination of the above embodiments, at least one of the first cap and the second cap include an electrical device.

In any combination of the above embodiments, the electrical device includes at least one of a sensor, a LED, a display.

In any combination of the above embodiments, the case is a shape consisting at least one of a sphere, a cylinder, a cone, a cube, a cuboid, a hexagonal prism, a square-based pyramid, a tetrahedron, a triangular prism, or any three dimensional structure having one or more curved faces.

In some embodiments, a payload container such as the payload container described in any of the embodiments above comprise, an outer wall surrounding a chamber, the outer wall having a first end and a second end, at least one of the first end and the second end configured to receive a case that comprises a battery pack for providing a power source for the UAV, a first electrical lead configured to connect to the battery pack, and a second electrical lead configured to connect to a power distribution board of the UAV. Advantageously, these and other embodiments, as described herein, improve the way UAVs or devices within the UAVs or containers or cases within the UAVs operate in terms of computer resource consumption (e.g., power, CPU, memory, I/O, network latency) and efficiency.

In any combination of the above embodiments, the outer wall is cylindrical.

In any combination of the above embodiments, the battery pack is rechargeable.

In any combination of the above embodiments, the first electrical lead and the second electrical lead are metal pads and configured to electrically connect to a wire extending out of the payload container.

In any combination of the above embodiments, the front end is a closed end and the rear end is an open end, wherein the rear end is configured to receive the case.

In any combination of the above embodiments, the first electrical lead is configured to communicate with a power distribution board of the UAV and the second electrical lead is configured to communicate with a power distribution board of the UAV.

In any combination of the above embodiments, the wire connected to the first electrical lead protrudes through a bumper and the wire connected to the second electrical lead protrudes through a clamp.

In some embodiments, a UAV such as the UAV described in any of the embodiments above comprise, a payload container. The payload container comprises a case for carrying loads by UAV. The case comprises a battery pack, wherein when the case is secured to the UAV, the battery pack is configured to provide a power source for the UAV. The payload container further comprises an outer wall surrounding a chamber, the payload container has a front end and a rear end, at least one of the front end and the second end is configured to receive the case. The payload container further comprises a first electrical lead configured to connect to the battery pack. The payload container further comprises a second electrical lead configured to connect to a power distribution board of the UAV. Advantageously, these and other embodiments, as described herein, improve the way UAVs or devices within the UAVs or containers or cases within the UAVs operate in terms of computer resource consumption (e.g., power, CPU, memory, I/O, network latency) and efficiency.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b). As used herein, the term "about" is used to connote ±10%, unless otherwise stated. For instance, about 2 is intended to mean 2±10%, or more precisely a value equal to or between 1.8 and 2.2.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A case for carrying loads by an Unmanned Aerial Vehicle (UAV), the case comprising:
   a first end comprising a first cap and a first opening;
   a second end comprising a second cap and a second opening; and
   a battery pack that, when the case is secured to the UAV, is configured to provide a power source for the UAV, wherein each of the first cap and the second cap comprises at least one metal connector for delivering power to the UAV, and the battery pack is wrapped around at least a portion of the case.

2. The case of claim 1, wherein at least a portion of batteries in the battery pack is rechargeable.

3. The case of claim 1, wherein the at least one metal connector of the first cap is operably connected to a first connecter of a payload container.

4. The case of claim 1, wherein the at least one metal connector of the second cap is operably connected to a second connector in a retainer clamp.

5. The case of claim 1, wherein the second opening is smaller than the first opening.

6. The case of claim 1, wherein at least one of the first cap or the second cap comprises an electrical device.

7. The case of claim 6, wherein the electrical device comprises at least one of a sensor, a LED, or a display.

8. The case of claim 1, wherein the case is at least one of a sphere, a cylinder, a cone, a cube, a cuboid, a hexagonal prism, a square-based pyramid, a tetrahedron, a triangular prism, or a three-dimensional structure having one or more curved faces.

9. A payload container comprising:
an outer wall surrounding a chamber, the outer wall having a front end and a rear end, wherein at least one of the front end or the rear end is configured to receive a case that comprises a battery pack for providing a power source for an Unmanned Aerial Vehicle (UAV);
a front electrical lead configured to connect to the battery pack; and
a rear electrical lead configured to connect to a power distribution board of the UAV, wherein each of the front electrical lead and the rear electrical lead is a metal pad that is configured to electrically connect to a wire extending out of the payload container.

10. The payload container of claim 9, wherein the outer wall is cylindrical.

11. The payload container of claim 9, wherein the battery pack is rechargeable.

12. The payload container of claim 9, wherein the front end is closed, and the rear end is open and is configured to receive the case.

13. The payload container of claim 9, wherein the wire connected to the front electrical lead protrudes through a bumper and the wire connected to the rear electrical lead protrudes through a clamp.

14. A payload container comprising:
a case for carrying loads for an Unmanned Aerial Vehicle (UAV), wherein the case comprises a battery pack wrapped around at least a portion of the case that is configured to provide a power source for the UAV;
an outer wall surrounding a chamber, wherein the outer wall comprises a front end and a rear end, and at least one of the front end or the rear end is configured to receive the case;
a first electrical lead configured to connect to the battery pack; and
a second electrical lead configured to connect to a power distribution board of the UAV.

15. The payload container of claim 14, wherein the front end is closed, and the rear end is open and is configured to receive the case.

16. The payload container of claim 15, further comprising at least one clamp configured to retain that the case when the payload container is subject to at least one of a vibration or an inclination.

17. The payload container of claim 15, further comprising at least one clamp configured to move between an open clamp position and a recessed clamp position, wherein the at least one claim has a bias towards a center of the payload container as defined by the outer wall to hold the case within the payload container.

18. The payload container of claim 17, wherein the case further comprises a ring and the at least one clamp is configured to connect to the ring when in the recessed clamp position to hold the case within the payload container.

19. The payload container of claim 14, further comprising at least one clamp configured to act as an electrical connector to at least one of an electrical component of the UAV or an external electrical component.

* * * * *